US000001536H

United States Statutory Invention Registration [19]

[11] Reg. Number: H1536

[45] Published: Jun. 4, 1996

Karn et al.

[54] OVERBASED MATERIALS IN ESTER MEDIA

[75] Inventors: Jack L. Karn, Richmond Heights; Jody A. Kocsis, Chagrin Falls; Willis P. Nichols, Cleveland, all of Ohio

[73] Assignee: The Lubrizol Corporation, Wickliffe, Ohio

[21] Appl. No.: 420,188

[22] Filed: Apr. 11, 1995

[51] Int. Cl.[6] ..... C10M 105/36

[52] U.S. Cl. ..... 252/18

[58] Field of Search ..... 252/18

[56] References Cited

U.S. PATENT DOCUMENTS

| | | | |
|---|---|---|---|
| 3,515,669 | 6/1970 | LeSuer | 252/18 |
| 3,766,066 | 10/1973 | McMillen | 252/32.7 |
| 3,857,790 | 12/1974 | Saunders et al. | 252/18 |
| 4,057,504 | 11/1977 | Shiga et al. | 252/18 |
| 5,283,276 | 2/1994 | Best et al. | 524/166 |
| 5,298,177 | 3/1994 | Stoffa | 252/18 |
| 5,300,242 | 4/1994 | Nichols et al. | 252/38 |
| 5,397,484 | 3/1995 | Cane et al. | 252/18 |
| 5,427,700 | 6/1995 | Stoffa | 252/18 |

FOREIGN PATENT DOCUMENTS 405879 1/1991 European Pat. Off. .

*Primary Examiner*—Charles T. Jordan
*Assistant Examiner*—John R. Hardee
*Attorney, Agent, or Firm*—David M. Shold; Frederick D. Hunter, Sr.

[57] ABSTRACT

An overbased material is prepared in a liquid ester medium which is subject to saponification upon exposure to strong base, by preparing a mixture of an acidic material having at least about 8 carbon atoms in a volatile oleophilic medium which is substantially inert to base; adding to the mixture a stoichiometric excess of a metal base; adding to the mixture a gaseous acidic material under conditions to react with substantially all of the stoichiometric excess of the metal base; and adding the liquid ester medium to the resulting material.

26 Claims, No Drawings

OVERBASED MATERIALS IN ESTER MEDIA

BACKGROUND OF THE INVENTION

The present invention relates to a method for preparing overbased materials in media which are subject to hydrolysis.

Overbased materials, also referred to as superbased or hyperbased materials, are well known additives in the field of lubrication. These materials are metal salts of acidic organic compounds. Overbased materials are generally single phase, homogeneous, and generally apparently Newtonian systems characterized by a metal content in excess of that which would be present according to the stoichiometry of the metal and the particular acidic organic compound reacted with the metal. overbasing, generally, is a means for supplying a large quantity of basic material in a form which is soluble or dispersible in oil. A variety of media are known which are useful as the oil in which the overbased salt can be dissolved or suspended. Many materials, however, have been practically precluded from use as the medium because they are not stable under the conditions of overbasing. Noteworthy in this regard are esters, including synthetic ester oils and natural ester oil products. The present invention provides a method for preparing overbased materials in such hydrolytically unstable media.

U.S. Pat. No. 3,766,066, McMillen, Oct. 16, 1973, discloses a process for preparing solid, metal-containing micelliar complexes by isolating the solid, metal-containing matter from homogenized, overbased organic acids with the aid of conversion agents. The metal-containing materials can be separated from the diluents by thin-film evaporation techniques, vacuum distillation procedures, precipitation techniques, and the like. The metal containing compositions are readily and stably dispersed in nonpolar organic liquids. The nonpolar organic liquid can be, e.g., benzene, hydrocarbons, halogenated hydrocarbons, such as 1,1,1-trichloroethane. The solids can also be incorporated into various plastics, paints, caulks, rubbers, and the like.

U.S. Pat. No. 5,300,242, Nichols et al., Apr. 5, 1994, equivalent to PCT publication WO93/18119, Sep. 16, 1993, discloses a metal overbased composition comprising at least one natural animal or vegetable oil, a metal base oxide, hydroxide, or alkoxide, to form a saponified intermediate, and reacting excess metal base with an acidic gas. The reaction can be conducted in xylene. During post-reaction vacuum stripping, a vegetable oil can be added as a diluent.

European Publication 405 879, Jan. 2, 1991, discloses preparation of basic calcium sulphonate by carbonating a substantially oil free mixture of a sulphonic acid and or an alkaline earth metal sulphonate, a hydrocarbon solvent, an alcohol, and an excess of calcium oxide or calcium hydroxide, removing the residual alcohol and optionally adding the medium other than oil in which it is desired to obtain the basic calcium sulphonate and removing the hydrocarbon solvent used. A lubricant can be obtained by adding a lubricating medium such as a synthetic ester or fatty acid ester.

U.S. Pat. No. 5,238,276, Best et al., Feb. 1, 1994, discloses coating compositions comprising a dispersion or solution of (a) colloidal size amorphous overbased sulfonate, (b) solvent or plasticizer, and (c) polymeric material soluble in the solvent or compatible with the plasticizer. Preferably the composition is free from any mineral oil. A lubricant may be obtained by adding a lubricating medium such as a synthetic ester or fatty acid ester.

SUMMARY OF THE INVENTION

The present invention provides a process for preparing an overbased material in a liquid ester medium which is subject to saponification upon exposure to strong base, comprising:

(a) preparing a mixture of an acidic material having at least about 8 carbon atoms in a volatile oleophilic medium which is substantially inert to base;

(b) adding to the mixture a stoichiometric excess of a metal base;

(c) adding to the mixture a gaseous acidic material under conditions to react with substantially all of the stoichiometric excess of the metal base; and (d) adding said liquid ester medium to the resulting material.

DETAILED DESCRIPTION OF THE INVENTION

Overbased materials are single phase, homogeneous systems characterized by a metal content in excess of that which would be present according to the stoichiometry of the metal and the particular acidic organic compound reacted with the metal. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5. The basic salts of the present invention often have a metal ratio of 1.1 to 40, preferably 1.5 to 30, more preferably 3 to 25, and still more preferably 7 to 20.

The overbased materials are prepared by reacting an acidic material, normally an acidic gas such as carbon dioxide, sulfur dioxide, or sulfur trioxide, hydrogen chloride, or hydrogen sulfide, and most commonly carbon dioxide, with a mixture comprising an acidic organic compound, a reaction medium normally comprising an oleophilic medium, a stoichiometric excess of a metal base, and preferably a promoter.

The oleophilic medium used for preparing and containing overbased materials will normally be an inert solvent for the acidic organic material. The oleophilic medium can be an oil or an organic material which is readily soluble or miscible with oil. Suitable oils include oils of lubricating viscosity, including natural or synthetic lubricating oils and mixtures thereof. Natural oils include animal oils; vegetable oils including sunflower oils, including high oleic sunflower oil available under the name Trisun™λ, rapeseed oil, and soybean oil; mineral lubricating oils of paraffinic, naphthenic, or mixed types; solvent or acid treated mineral oils; and oils derived from coal or shale. Synthetic lubricating oils include hydrocarbon oils, halo-substituted hydrocarbon oils, alkylene oxide polymers (including those made by polymerization of ethylene oxide or propylene oxide), esters of dicarboxylic acids and a variety of alcohols including polyols, esters of monocarboxylic acids and polyols, esters of phosphorus-containing acids, polymeric tetrahydrofurans, and silicon-based oils (including siloxane oils and silicate oils). Included are unrefined, refined, and rerefined oils. Specific examples of oils are described in U.S. Pat. No. 4,326,972. It is noted, however, that the oils which comprise esters are limited in their usefulness, as described above, by their tendency to undergo hydrolysis under conditions of overbasing, set forth in greater detail below.

Suitable organic materials which are readily soluble or miscible with oil are generally substantially non-polar or non-protic materials which are liquids at room temperature. They are preferably volatile liquids which can be removed by evaporation or distillation if desired. Suitable materials include alkanes and haloalkanes of 5 to 30 carbon atoms, polyhaloalkanes, cycloalkanes of 5 or more carbon atoms, alkyl substituted alkanes, aryl hydrocarbons, alkylaryl hydrocarbons, haloaryl hydrocarbons, ethers such as dialkyl ethers, alkyl aryl ethers, cycloalkyl ethers, and mixtures of these. Also useful are low molecular weight liquid polymers, generally classified as oligomers, including dimers, tetramers, pentamers, etc., including such materials as propylene tetramers and isobutylene dimers. Also useful are liquid petroleum fractions such as naphth- ene-based or paraffin-based petroleum fractions.

The acidic organic compounds useful in making overbased compositions include carboxylic acids, sulfonic acids, phosphorus-containing acids, phenols or mixtures of two or more thereof. The preferred acid materials are carboxylic acids. (Any reference to acids, such as carboxylic, or sulfonic acids, is intended to include the acid producing derivatives thereof such as anhydrides, alkyl esters, acyl halides, lactones, ammonium salts, and mixtures thereof unless otherwise specifically stated.)

The carboxylic acids useful in making overbased salts may be aliphatic or aromatic, mono- or polycarboxylic acid or acid-producing compounds. These carboxylic acids include lower molecular weight carboxylic acids as well as higher molecular weight carboxylic acids (e.g. having more than 8 or more carbon atoms).

Carboxylic acids, particularly the higher carboxylic acids, are preferably soluble in the oleophilic medium. Usually, in order to provide the desired solubility, the number of carbon atoms in a carboxylic acid should be at least about 8, e.g., 8 to 400, preferably 10 to 50, and more preferably 10 to 22.

The carboxylic acids include saturated and unsaturated acids. Examples of such useful acids include dodecanoic acid, decanoic acid, tall oil acid, 10-methyl-tetradecanoic acid, 3-ethyl-hexadecanoic acid, and 8-methyl-octadecanoic acid, palmitic acid, stearic acid, myristic acid, oleic acid, linoleic acid, behenic acid, hexatriacontanoic acid, tetrapropylenyl-substituted glutaric acid, polybutenyl-substituted succinic acid derived from a polybutene (Mn=200– 1500), polypropenyl-substituted succinic acid derived from a polypropene, (Mn=200–1000), octadecyl-substituted adipic acid, chlorostearic acid, 12-hydroxystearic acid, 9-methylstearic acid, dichlorostearic acid, ricinoleic acid, lesquerellic acid, stearyl-benzoic acid, eicosanyl-substituted naphthoic acid, di- lauryl-decahydronaphthalene carboxylic acid, mixtures of any of these acids, their alkali and alkaline earth metal salts, their ammonium salts, their anhydrides, and/or their esters, triglycerides, etc. A preferred group of aliphatic carboxylic acids includes the saturated and unsaturated higher fatty acids containing from about 12 to about 30 carbon atoms. Other acids include aromatic carboxylic acids including substituted and non-substituted benzoic, phthalic and salicylic acids or anhydrides, most especially those substituted with a hydrocarbyl group containing about 6 to about 80 carbon atoms. Examples of suitable substituent groups include butyl, isobutyl, pentyl, octyl, nonyl, dodecyl, and substituents derived from the above-described polyalkenes such as polyethylenes, polypropylenes, polyisobutylenes, ethylene-propylene copolymers, oxidized ethylene-propylene copolymers, and the like. Suitable materials also include derivatives functionalized, by addition of sulfur, phosphorus, halogen, etc.

Other carboxylic acids include the condensates of a substituted phenol and an aidehyde-containing acid such as glyoxylic acid. These materials may initially exist in the ring-closed lactone form, but they can generally react as acids in so far as salt formation is concerned. These adducts, salts thereof, and methods of their preparation are described in greater detail in U.S. Pat. Nos. 5,356,546, Oct. 18, 1994, and 5,281,346, Jan. 25, 1994.

Sulfonic acids are also useful in making overbased salts and include the sulfonic and thiosulfonic acids. The sulfonic acids include the mono- or polynuclear aromatic or cycloaliphatic compounds. The oil-soluble sulfonates can be represented for the most part by one of the following formulae: $R_2$-T-$(SO_3)_a$ and $R_3$-$(SO_3)_b$, wherein T is a cyclic nucleus such as, for example, benzene, naphthalene, anthracene, diphenylene oxide, diphenylene sulfide, petroleum naphthenes, etc.; $R_2$ is an aliphatic group such as alkyl, alkenyl, alkoxy, alkoxyalkyl, etc.; $(R_2)$+T contains a total of at least about 15 carbon atoms; and $R_3$ is an aliphatic hydrocarbyl group containing at least about 15 carbon atoms. Examples of $R_3$ are alkyl, alkenyl, alkoxyalkyl, carboalkoxyalkyl, etc. Specific examples of $R_3$ are groups derived from petrolatum, saturated and unsaturated paraffin wax, and the above-described polyalkenes. The groups T, $R_2$, and $R_3$ in the above Formulae can also contain other inorganic or organic substituents in addition to those enumerated above such as, for example, hydroxy, mercapto, halogen, nitro, amino, nitroso, sulfide, disulfide, etc. In the above Formulae, a and b are at least 1.

Illustrative examples of these sulfonic acids include monoeicosanyl-substituted naphthalene sulfonic acids, dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polybutene having a number average molecular weight (Mn) in the range of 500 to 5000 with chlorosulfonic acid, nitronaphthalene sulfonic acid, paraffin wax sulfonic acid, cetyl-cyclopentane sulfonic acid, lauryl-cyclohexane sulfonic acids, polyethylenyl-substituted sulfonic acids derived from polyethylene ($M_n$= 300–1000), etc. Normally the aliphatic groups will be alkyl and/or alkenyl groups such that the total number of aliphatic carbons is at least about 8.

Another group of sulfonic acids are mono-, di-, and tri-alkylated benzene and naphthalene (including hydrogenated forms thereof) sulfonic acids. Such acids include di-isododecyl-benzene sulfonic acid, polybutenyl-substituted sulfonic acid, polypropylenyl-substituted sulfonic acids derived from polypropene having an $M_n$=300–1000, cetylchlorobenzene sulfonic acid, dicetylnaphthalene sulfonic acid, di-lauryldiphenylether sulfonic acid, diisononylbenzene sulfonic acid, di-isooctadecylbenzene sulfonic acid, stearylnaphthalene sulfonic acid, and the like.

Specific examples of oil-soluble sulfonic acids are mahogany sulfonic acids; bright stock sulfonic acids; sulfonic acids derived from lubricating oil fractions having a Saybolt viscosity from about 100 seconds at 37.8° C. (100° F.) to about 200 seconds at 98.9° C. (210° F.); petrolatum sulfonic acids; mono- and poly-wax-substituted sulfonic and polysulfonic acids of, e.g., benzene, naphthalene, phenol, diphenyl ether, naphthalene disulfide, etc.; other substituted sulfonic acids such as alkyl benzene sulfonic acids (where the alkyl group has at least 8 carbons), cetylphenol mono-sulfide sulfonic acids, dilauryl beta naphthyl sulfonic acids, and alkaryl sulfonic acids such as dodecyl benzene "bottoms" sulfonic acids (the material leftover after the removal of dodecyl benzene sulfonic acids that are used for household detergents). The production of sulfonates from detergent manufactured by-products by reaction with, e.g., $SO_3$, is well known to those skilled in the art.

Phosphorus-containing acids are also useful in making basic metal salts and include any phosphorus acids such as phosphoric acid or esters; and thiophosphorus acids or esters, including mono and dithiophosphorus acids or esters. Preferably, the phosphorus acids or esters contain at least one, preferably two, hydrocarbyl groups containing from 1 to about 50 carbon atoms. The phosphorus-containing acids useful in the present invention are described in U.S. Pat. No. 3,232,883 issued to Le Suer.

The phenols useful in making basic metal salts are generally represented by the formula $(R_1)_a$-Ar-$(OH)_b$, wherein $R_1$ is a hydrocarbyl group; Ar is an aromatic group; a and b are independently numbers of at least one, the sum of a and b being in the range of two up to the number of displaceable hydrogens on the aromatic nucleus or nuclei of Ar. $R_1$ and a are preferably such that there is an average of at least about 8 aliphatic carbon atoms provided by the $R_1$ groups for each phenol compound. The aromatic group as represented by "Ar" can be mononuclear such as a phenyl, a pyridyl, or a thienyl, or polynuclear.

The metal compounds useful in making the basic metal salts are generally any Group 1 or Group 2 metal compounds (CAS version of the Periodic Table of the Elements). The Group 1 metals of the metal compound include Group 1a alkali metals (sodium, potassium, lithium, etc.) as well as Group 1b metals. The Group 1 metals are preferably sodium, potassium, and lithium, more preferably sodium or potassium, and more preferably sodium. The Group 2 metals of the metal base include the Group 2a alkaline earth metals (magnesium, calcium, barium, etc.) as well as the Group 2b metals such as zinc or cadmium. Preferably the Group 2 metals are magnesium, calcium, barium, or zinc, preferably magnesium or calcium. Generally the metal compounds are delivered as metal salts. The anionic portion of the salt can be hydroxyl, oxide, carbonate, borate, etc.

Promoters are chemicals which are sometimes employed to facilitate the incorporation of metal into the basic metal compositions. Among the chemicals useful as promoters are water, ammonium hydroxide, organic acids of up to about 8 carbon atoms, nitric acid, hydrochloric acid, metal complexing agents such as alkyl salicylaldoxime, and alkali metal hydroxides such as lithium hydroxide, sodium hydroxide and potassium hydroxide, and mono- and polyhydric alcohols of up to about 30 carbon atoms. Examples of the alcohols include methanol, ethanol, isopropanol, dodecanol, behenyl alcohol, ethylene glycol, monomethyl ether of ethylene glycol, hexamethylene glycol, glycerol, pentaerythritol, benzyl alcohol, phenylethyl alcohol, aminoethanol, cinnamyl alcohol, allyl alcohol, and the like. Especially useful are the monohydric alcohols having up to about 10 carbon atoms and mixtures of methanol with higher monohydric alcohols. In a preferred embodiment, the promoter comprises at least one alcohol of 1 to about 6 carbon atoms or a mixture thereof with water. It is characteristic of promoters that they are normally employed in low quantities, typically 5–10% of the reaction mixture, or less than 1–2% by weight of the reaction mixture if the promoter is not later removed. Thus they do not normally constitute an appreciable portion of the acid functionality of the composition, but serve rather a role more as a catalyst for the overbasing process.

In preparing overbased materials, the organic acid material to be overbased normally is brought together in an inert oleophilic medium, with the metal base, the promoter, and the carbon dioxide or other acidic compound (introduced, for example, by bubbling gaseous carbon dioxide into the mixture), and a chemical reaction ensues. The reaction temperature will depend to some extent on the metallic base employed and on the promoter; it is typically 20°– 150° C. (68°–300° F.), sometimes 38°–93° C. (100°–200° F.). The exact nature of the resulting overbased product is not known, but it can be described as a single phase homogeneous mixture of the solvent and either (1) a metal complex formed from the metal base, the carbon dioxide, and the organic acid and/or (2) an amorphous metal salt formed from the reaction of the carbon dioxide with the metal base and the organic acid. For purposes of the present invention the overbased material can be described as a mixture of a metal salt of an organic acid material with a metal carbonate. A more complete description of the process for preparing ordinary overbased materials can be found in U.S. Pat. No. 3,766,067, McMillen.

The inert oleophilic medium is preferably not an ester-based oil, since such a material would not be inert to the conditions of overbasing. Indeed, it is known that natural oils, in the form of esters (e.g., triglycerides) can be subjected to overbasing conditions to cause hydrolysis to the corresponding fatty acids. The fatty acids thus formed in situ then serve as the substrate for the subsequent overbasing.

The overbased material, in its initially formed state, is generally a homogeneous, Newtonian fluid. Such materials can be converted into a colloidal disperse system (a "gel") by homogenizing a "conversion agent" with the ini- initially-formed overbased material. This process is described in greater detail in U.S. Pat. No. 3,492,231, McMillen. Homogenization is achieved by vigorous agitation of the two components, preferably at the reflux temperature or a temperature slightly below the reflux temperature, which will depend upon the boiling point of the conversion agent. However, homogenization may be achieved within the range of about 25° C. to about 200° C. or slightly higher. Usually there is no real advantage in exceeding 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used in the specification and claims is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids (i.e., those containing fewer than 8 carbon atoms, especially formic acid, propionic acids, and preferably acetic acid), water, aliphatic alcohols, preferably those containing fewer than 12 or 8 carbon atoms (e.g., methanol, ethanol, isopropanol, n-propanol, isobutanol, tertiary butanol, isooctanol, dodecanol, n-pentanol; cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The use of a mixture of water and one or more of the alcohols is especially effective for converting the overbased materials to colloidal disperse systems. Such combinations often reduce the length of time required for the process. A very effective combination is a mixture of one or more alcohols and water in a weight ratio of alcohol to water of from about 0.05:1 to about 24:1. Alcohol:water conversions and the process of conversion generally are illustrated in U.S. Pat. No. 3,372,115, McMillen.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (m.w. 350)-substituted phenol, and the like.

Other useful conversion agents include lower aliphatic aldehydes and ketones, particularly lower alkyl aldehydes and lower alkyl ketones. Various aliphatic, cycloaliphatic, aromatic, and heterocyclic amines are also useful providing they contain at least one amino group having at least one active hydrogen attached thereto. Boron acids are also useful conversion agents as are the phosphorus acids. Carbon dioxide can also be used as the conversion agent. However, it is preferable to use this conversion agent in combination with one or more of the foregoing conversion agents. For example, the combination of water and carbon dioxide is effective as a conversion agent for transforming overbased materials into a colloidal disperse system.

As has been stated above, overbased materials, whether in their initial form or in the converted gel form, are not normally prepared in ester media. However, it is often desirable to employ esters as base fluids for lubricating compositions because of their lavorable environmental characteristics. By employing the method of the present invention, overbased materials can be conveniently prepared in ester or other media which are susceptible to hydrolysis under overbasing conditions. This is effected by initially conducting the overbasing reaction in a volatile medium which can subsequently be removed. More specifically, it includes (a) preparing a mixture of an acidic material having at least about 8 carbon atoms, that is, any known substrate for the overbasing reaction; in a volatile oleophilic medium which is substantially inert to base; (b) adding to the mixture a stoichiometric excess of a metal base; (c) adding to the mixture a gaseous acidic material (e.g., carbon dioxide, as described above) under conditions to react with substantially all of the stoichiometric excess of the metal base; (d) removing at least a portion of the volatile oleophilic medium from the mixture; and finally (e) adding a liquid ester medium to the resulting material.

The volatile organic media which are substantially inert to base are generally substantially non-polar or non-protic materials which are liquids at room temperature. They are preferably volatile liquids which can be removed by evaporation or distillation or other related techniques such a vacuum stripping. Thus they are typically hydrocarbons liquid having a normal boiling point of at most about 200° C. Suitable materials include alkanes and haloalkanes of 5 to 30 carbon atoms, polyhaloalkanes, cycloalkanes of 5 or more carbon atoms, alkyl substituted alkanes, aryl hydrocarbons, alkylaryl hydrocarbons, haloaryl hydrocarbons, ethers such as dialkyl ethers, alkyl aryl ethers, cycloalkyl ethers, and mixtures of these. Also useful are low molecular weight liquid polymers, generally classified as oligomers, including dimers, tetramers, pentamers, etc., including such materials as propylene tetramers and isobutylene dimers. Also useful are liquid petroleum fractions such as naphthene-based or paraffin-based petroleum fractions. Specific preferred materials include mineral spirits, kerosene, toluene, and xylene.

At least a portion of this volatile organic medium can be removed from the composition at some stage after the overbasing reaction is complete. Heating of the overbased material to a suitable temperature or subjecting it to vacuum can lead to removal of the volatile oleophilic medium to the extent desired. Most commonly only a portion of the medium is removed at this stage, typically by a distillation process. Other methods of drying can be used if more complete removal of the medium is desired, including bulk drying, vacuum pan drying, spray drying, flash stripping, thin film drying, vacuum double drum drying, indirect heat rotary drying, and freeze drying. Other methods of removal of the medium can also be employed as will be apparent to those skilled in the art.

The inert organic medium can be removed to the extent desired. It is possible even to completely isolate the solid components of the overbased material as dry or nearly dry solids, by removing substantially all of the organic medium. In this context the term "solid" or "solids" includes not only sensibly dry materials, but also materials with a high solids content which still contain a relatively small amount of residual liquid. It is also possible, to remove only a portion of the volatile organic material and to add to the residue a portion of the desired ester or other oleaginous medium. Commonly up to 75% of the volatile medium is removed prior to addition of the liquid ester medium. The result in that case would be a composition which still contains a certain amount of the volatile medium. The remaining amount will normally be removed by further heating or vacuum treatment after addition of the ester medium.

If the overbased solid has been dried to substantial dryness, it can be reformulated by admixing into a liquid ester medium. The ester medium, whether thus admixed with a dried solid or added to a formulation which still contains volatile solvent, can be a vegetable oil, such as castor oil, rapeseed oil, tall oil, or sunflower oil. It can also be a synthetic ester oil, such as an ester of an alkanoic acid having at least about 8 carbon atoms and a polyol having at least 3 carbon atoms and at least 3 hydroxy groups. Specific examples of synthetic esters include the esters of trimethylolpropane or ditrimethylolpropane with iso-nonanoic acid or neo-decanoic acid, and ethylhexyl azelate.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no nonhydrocarbon substituents in the hydrocarbyl group.

EXAMPLES

Example 1

To a 5 L 4 neck flask, equipped with stirrer, thermometer, subsurface tube, and condenser, is charged 194 g calcium hydroxide, 450 g of a mixture of isobutyl and amyl alcohols, and 1000 g xylene. Stirring is begun, and a mixture of 0.6 g calcium chloride in 15.9 g water is added. To the mixture is added, over a period of 20 minutes, 1600 g of a mixture of a polypropylenephenolsulfonic acid (equivalent weight 853) containing 32.2% hexane diluent. During the addition the temperature increases to 45° C. The mixture is stripped by heating to 150° C. Thereafter an additional 1000 g xylene is added to the hot mixture; upon cooling to 52° C., 301 g methanol is added.

The mixture is stirred under nitrogen at high speed and carbon dioxide is added by bubbling at 28 L/hr (1 std. $ft^3$/hr). After 54 minutes, a small amount of carbon dioxide is venting.

The mixture is heated to 125° C. to remove volatiles, followed by vacuum stripping. Hercolube F™ pentaerythritol-based synthetic ester fluid, 1513 g, is added to the mixture, which is then subjected to further vacuum stripping. A small amount of filter aid is added. Filtration yields the final product.

Example 2

To a 2 L 4-neck flask equipped as in Example 1 is charged 853 g of a mixture of a polypropylenephenolsulfonic acid (equivalent weight 853) containing 32.2% hexane diluent and 571 g xylene. To the mixture is added 68.5 g magnesium oxide in two portions, along with 87.8 g methanol, with gentle heating and an increase in temperature to 58° C. Tap water, 58 g is added, and heating is continued. When the temperature of the mixture reaches 62° C., addition of carbon dioxide is begun, at 14 L/hr (0.5 std. $ft^3$/hr). After 67 minutes, a small amount of carbon dioxide is venting. The mixture is further heated under carbon dioxide flow to remove volatiles, then vacuum stripped. Hercolube F™ is added to amount to 50% of the final composition and the material is worked up as in Example 1 to yield a product.

Example 3

To a 3 L flask equipped as in Example 1 is charged 111 g calcium hydroxide, 122 g mixed isobutyl and amyl alcohols, and, with stirring, a mixture of 3.2 g calcium chloride in 8.5 g water. Over a period of 20 minutes, 1442 g of the condensation product of a propylene tetramer-substituted phenol, formaldehyde, and salicylic acid (1:1.1:0.5 mole ratio) is added (containing 50 % xylene diluent), resulting in an increase in temperature of the mixture to 38° C.; a small amount of additional xylene is used to wash residual reactants into the reaction flask. The mixture is heated to 93° C. and maintained at temperature for 1 hour. The mixture is then stripped of volatiles at 150° C. for 1.5–2 hours. After cooling the mixture, an additional 200 g xylene is added as well as 122 g methanol, and the mixture is heated to 55° C. The mixture is treated by bubbling carbon dioxide at 14 L/hr (0.5 std. $ft^3$/hr) for about 1.6 hours. The mixture is stripped with nitrogen to 150° C., and 668 g Hercolube F™ is added to amount to 45% of the composition. The product is isolated as in Example 1.

Example 4

To a flask equipped as in Example 3 is charged 58.0 g tap water, 87.9 g methanol, and 68.5 g magnesium oxide. To the mixture is added, with stirring over a period of ½ hour, 1442 g of the condensation product described in Example 3 (using a small amount of xylene to wash in the residual reactant). The mixture is heated to 61° C., and carbon dioxide is bubbled thereinto at 14 L/hr (0.5 std. $ft^3$/hr) for about 2 hours. The mixture is heated to 151 ° C. over 1.5 hours under continued carbon dioxide flow to remove volatiles, and then cooled. At 125° C., 1181 g of Hercolube F™ is added, to amount to 59.7% of the composition. the product is isolated as in Example 1.

Example 5

Into a flask equipped as in Example 3 is charged, with stirring, 556 g tall oil fatty acid, 900 g xylene, 126 g magnesium oxide, 112 g methanol, and 82 g tap water. The mixture is heated to 63° C. and carbon dioxide is introduced at 2 8 L/hr (1 std. $ft^3$/hr) for 2 hours. The mixture is thereafter heated to 120° C. and stripped of water and methanol, and thereafter cooled to room temperature. The mixture is reheated to 120° C., with stirring, and 1000 g Trisun® 80 high oleic vegetable oil is added dropwise, while slowly increasing the temperature and removing xylene with a nitrogen sweep, followed by vacuum stripping. The product is isolated by filtration as in Example 1.

Example 6

Into a flask equipped as in Example 3 is charged, with stirring and gentle heating, 574 g of a $C_{20-24}$alkylbenzene sulfonic acid (a commercial material containing a small amount of unsulfonated alkylbenzene diluent), 848 g xylene, and 68.5 g magnesium oxide, followed by 8.8 g acetic acid, 87.9 g methanol, and 58 g tap water. The mixture exhibits an exothermic reaction, and the temperature is maintained at 60°–66° C. Carbon dioxide is blown into the mixture at 28 L/hr (1 std. $ft^3$/hr) for about 50 minutes, until uptake of carbon dioxide ceases. The mixture is heated to 110° C. and the mixture is purged with first carbon dioxide, then nitrogen, to remove volatiles. At 120° C., 426 g Trisun®80 high oleic vegetable oil is added, while continuing to remove and trap xylene. The mixture is heated to 165° C., stripping the remainder of the xylene, then vacuum stripped at 2.7 kPa (20 mm Hg). The product is isolated by filtration as in Example 1.

Example 7

Into a flask equipped as in Example 3 is charged, with stirring, without heating, 770 g of a $C_{24}$alkylbenzenesulfonic acid (containing a small amount (about 12%) of unsulfonated alkylbenzene diluent), 550 g xylene, 89.1 g magnesium oxide, and 11.4 g acetic acid. Methanol, 114 g, and tap water, 75 g, are slowly added. The mixture exhibits an exothermic reaction, and the temperature is maintained at 60°–66° C. Carbon dioxide is blown into the mixture at 28 L/hr (1 std. $ft^3$/hr) for about 1.5 hours. The mixture is stripped with additional carbon dioxide at 130° C., at which time 530 g decanoic acid ditrimethylolpropane synthetic ester is added. Heating is continued to 150° C., followed by vacuum stripping at 160° C. at 2.7 kPa (20 mm Hg). The product is isolated by filtration as in Example 1.

Example 8

Into a 5 L flask equipped as in Example 1 is charged, with stirring and gentle heating, 1000 g sodium alkyl salicylate (a commercial material having a molecular weight of 670 (salicylate) and containing 35.6% solvent diluent), a solution of 153 g calcium chloride in 414 g methanol, and 414 g mixed isobutyl and amyl alcohols. The mixture is maintained at 60° C. for 1 hour, then cooled to 45° C., whereupon 74 g calcium hydroxide is added. Carbon dioxide is bubbled into the mixture at 28 L/hr (1 std. $ft^3$/hr) at about 50° C. to a base neutralization number (phenolphthalein) of 15–22. The mixture is stripped under a nitrogen flow of 28 L/hr (1 std. $ft^3$/hr) at 150° C., while adding 762 g decanoic acid di-trimethylolpropane synthetic ester. Thereafter the mixture is vacuum stripped at 130° C. at 2.7 kPa (20 mm Hg). The product is isolated by filtration as in Example 1.

Example 9.

To a 2 L flask equipped as in Example 1 is charge, with stirring, 588 g $C_{20-24}$ alkyl benzenesulfonic acid (containing about 15% unsulfonated diluent), 87 g dodecyl phenol, and 500 g xylene. The mixture is heated and 120 g 50% aqueous sodium hydroxide is added. Heating is continued to reflux, collecting water in a Dean-Stark trap. A nitrogen sweep of 14 L/hr (0.5 std. $ft^3$/hr) is maintained to facilitate drying, while the temperature rises to 140°–150° C., until removal of additional water is negligible.

The reaction mixture is cooled to 100° C., and 100 g solid sodium hydroxide is added. The mixture is again heated to reflux, removing water. When the temperature reaches 140° C., blowing with sulfur dioxide at 14 L/hr (0.5 std. $ft^3$/hr) is begun. Blowing is continued until 96 g has been charged, indicated by weight loss in the $SO_2$ cylinder. Azeotropic removal of water continues during this time.

Thereafter the reaction mixture is heated to reflux under a nitrogen sweep of 14 L/hr (0.5 std. $ft^3$/hr) to remove residual water of reaction. Thereafter xylene is removed by distillation with the nitrogen sweep continuing. As the xylene is removed it is gradually replaced by adding, in portions, 600 g rapeseed oil. The mixture is then subjected to vacuum stripping at 150°–160° C. and 2.7 kPa (20 mm Hg). The product is isolated by filtration at 120° C. using 150 g of a filter aid.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. As used herein, the expression "consisting essentially of" permits the inclusion of substances which do not materially affect the basic and novel characteristics of the composition under consideration.

What is claimed is:

1. A process preparing an overbased material in a liquid ester medium which is subject to saponification upon exposure to strong base, comprising:

(a) preparing a mixture of an acidic material having at least about 8 carbon atoms in a volatile oleophilic medium which is substantially inert to base;

(b) adding to the mixture a stoichiometric excess of a metal base;

(c) adding to the mixture a gaseous acidic material under conditions to react with substantially all of the stoichiometric excess of the metal base; and (d) adding said liquid ester medium to the resulting material.

2. The process of claim 1. wherein at least a portion of the volatile oleophilic medium is removed before the liquid ester medium is added.

3. The process of claim 1. wherein at least a portion of the volatile oleophilic medium is removed after the liquid ester medium is added.

4. The process of claim 3. wherein substantially all of the volatile oleophilic medium is removed.

5. The composition of claim 1. wherein the liquid ester medium is a vegetable oil.

6. The process of claim 5. wherein the vegetable oil is castor oil, rapeseed oil, tall oil, or sunflower oil.

7. The process of claim 1. wherein the liquid ester medium is a synthetic ester.

8. The process of claim 7. wherein the synthetic ester is an ester of an alkanoic acid having at least about 8 carbon atoms and a polyol having at least 3 carbon atoms and at least 3 hydroxy groups.

9. The process of claim 8. wherein the synthetic ester is the ester of trimethylolpropane or di-trimethylolpropane with iso-nonanoic acid or neodecanoic acid.

10. The process of claim 1 wherein the acid material containing at least about 8 carbon atoms is a carboxylic acid, sulfonic acid, phosphorus-containing acid, phenol, or mixtures thereof.

11. The process of claim 10. wherein the acid material is a hydrocarbylsubstituted benzenesulfonic acid.

12. The process of claim 10. wherein the acid material is a hydrocarbylsubstituted salicylic acid.

13. The process of claim 10. wherein the acid is a condensate of a phenol and glyoxylic acid.

14. The process of claim 1. wherein the volatile oleophilic medium is a hydrocarbon liquid having a normal boiling point of at most about 200° C.

15. The process of claim 1. wherein the volatile oleophilic medium is mineral spirits, kerosene, toluene, or xylene.

16. The process of claim 1. wherein included in the mixture of step (a) is a promoter in an amount suitable to promote the incorporation of the acidic gaseous material.

17. The process of claim 16. wherein the promoter comprises at least one alcohol of 1 to about 6 carbon atoms or a mixture thereof with water.

18. The process of claim 1. wherein the metal base is an oxide or hydroxide of an alkali metal, an alkaline earth metal, zinc, or cadmium.

19. The process of claim 18. wherein the metal base is an oxide or hydroxide of calcium or magnesium.

20. The process of claim 1. wherein the amount of the metal base is about 1.1 to about 40 equivalents per equivalent of the acid material.

21. The process of claim 1. wherein the gaseous acidic material is carbon dioxide, sulfur dioxide, or sulfur trioxide, hydrogen chloride, or hydrogen sulfide.

22. The process of claim 21. wherein the gaseous acidic material is carbon dioxide.

23. The process of claim 1. wherein the gaseous acidic material is added by bubbling into a stirred reaction mixture.

24. The process of claim 1. wherein the mixture is maintained at about 25 to about 150° C. during the addition of the gaseous acidic material.

25. The process of claim 1. further comprising, after step (c), converting the overbased material to a gel.

26. The product of the process of claim 1.

* * * * *